United States Patent [19]
Copenhafer et al.

[11] Patent Number: 6,022,516
[45] Date of Patent: Feb. 8, 2000

[54] METHOD OF REDUCING THE FORMATION OF SCALE IN THE PRODUCTION OF SODA ASH FROM TRONA AND NAHCOLITE ORES

[75] Inventors: William C. Copenhafer, Yardley; Edward Maleskas, Marlin, both of Pa.

[73] Assignee: FMC Corporation, Philadelphia, Pa.

[21] Appl. No.: 09/099,887

[22] Filed: Jun. 17, 1998

Related U.S. Application Data

[60] Provisional application No. 60/050,561, Jun. 23, 1997.

[51] Int. Cl.$^7$ ........................................................ C01D 7/00
[52] U.S. Cl. ........................... 423/421; 423/206.2; 299/5; 210/699
[58] Field of Search ................................. 423/421, 206.2; 23/302 T; 210/699; 252/180; 299/5

[56] References Cited

U.S. PATENT DOCUMENTS

| | | | |
|---|---|---|---|
| 3,303,139 | 2/1967 | Blaser et al. | 252/180 |
| 3,655,331 | 4/1972 | Seglin et al. | 423/206.2 |
| 3,723,333 | 3/1973 | Von Freyhold | 252/180 |
| 3,959,360 | 5/1976 | Vazopolos | 423/488 |
| 4,021,527 | 5/1977 | Baadsgaard | 423/206.2 |
| 4,713,195 | 12/1987 | Schneider | 252/180 |
| 5,043,149 | 8/1991 | Frint et al. | 423/206 T |
| 5,053,161 | 10/1991 | Sprague | 252/180 |
| 5,262,134 | 11/1993 | Frint et al. | 423/184 |
| 5,283,054 | 2/1994 | Copenhafer et al. | 423/206.2 T |
| 5,294,371 | 3/1994 | Clubley et al. | 252/180 |
| 5,609,838 | 3/1997 | Neuman et al. | 423/206.1 |
| 5,866,032 | 2/1999 | Carey et al. | 252/180 |

*Primary Examiner*—Steven Bos
*Attorney, Agent, or Firm*—FMC Corporation

[57] ABSTRACT

The methods for decreasing scale formation in processes for the production of soda ash from trona or nahcolite ores are provided. Diphosphonic acid materials such as 1-hydroxy-ethylidene diphosphonic acid, 1-hydroxy-propylidene-1,-diphosphonic acid, 1-hydroxy-butylidene-1,-diphosphonic acid and 1-hydroxy-pentylidene-1,-diphosphonic acid have been found to diminish significantly the formation of magnesium scale in such processes.

20 Claims, 1 Drawing Sheet

METHOD OF REDUCING THE FORMATION OF SCALE IN THE PRODUCTION OF SODA ASH FROM TRONA AND NAHCOLITE ORES

CROSS REFERENCE TO RELATED APPLICATIONS

The instant application claims priority of provisional patent application Ser. No. 60/050,561 filed Jun. 23, 1997, entitled "Inhibition of Magnesium Scale Formation in the Production of Soda Ash from Trona" the entirety of which is incorporated herein by reference.

FIELD OF THE INVENTION

This invention is directed to improved processes for the production of soda ash, ($Na_2CO_3$ or sodium carbonate) from trona or nahcolite. This invention provides new ways of inhibiting the formation of magnesium scale that commonly occurs on the surfaces of processing equipment during the production of soda ash from such ores.

BACKGROUND OF THE INVENTION

This invention provides improvements to the current processes of extracting soda ash from trona ore. Trona ore is found in massive, deep rock trona deposits in sites such as Green River, Wyoming or Beypazari, Turkey. A typical profile of the trona deposit found in Green River, Wyoming is as follows:

| CONSTITUENT | PERCENTAGE |
| --- | --- |
| Sodium Sesquicarbonate | 90.00% |
| NaCl | 0.1 |
| $Na_2SO_4$ | 0.02 |
| Organic Matter | 0.3 |
| Insolubles | 9.58 |
| Total | 100.0 |

The main constituent of trona ore is sodium sesquicarbonate. Because of the presence of other constituents, trona ore needs to be processed to remove them in order to produce soda ash ($Na_2CO_3$) or other sodium-containing chemicals like sodium bicarbonate ($NaCO_3$) or caustic soda ($NaOH$). The prior art provides many methods to recover soda ash and other values from trona ore. These extraction processes can be classified as either dry mined or solution mined methods. Each type of mining is well known to persons of ordinary skill in the art as giving rise to trona ore. The trona may be solid or in the form of a solution, slurry, or suspension in the case of solution mining; all may be employed in connection with the present invention. Nahcolite ore has also been used for such purposes, albeit to a lesser extent. The present invention is applicable to nahcolite ores as well as to trona, however trona ore processing will be discussed throughout.

Two major types of processes using dry mined trona are typical and are practiced, e.g., in Green River, Wyo. The monohydrate process for obtaining soda ash from trona ore involves dry mining the ore. The ore is crushed into small pieces and then calcined through the application of heat to drive off water and carbon dioxide gases from the trona. The calcinate is then dissolved in water or dilute alkaline liquors which are recycled from the downstream process. The solution is then passed through settlers, clarifiers and/or thickeners, where insolubles are removed to waste. The process stream is then preferably sent through a carbon treatment and filtration step. The resulting liquor, essentially free of bicarbonate, is preferably sent to evaporative crystalizers to crystallize sodium carbonate monohydrate. This material can then be calcined to produce anhydrous soda ash product.

The sesquicarbonate process crushes trona ore prior to dissolution in recycled, diluted, mother liquor, followed by separation of insolubles such as via clarifiers and thickeners. Ore insolubles are comprised of oil shales and minerals such as dolomite and other minerals, which are not very soluble in the alkaline process liquors. The insolubles-free liquor, containing carbonate and bicarbonate, is fed to cooling crystallizers to crystallize sesquicarbonate which can then be calcined to soda ash.

A solution mined recovery process is described in U.S. Pat. No. 5,283,054, which is incorporated herein by reference. In the processes described therein, trona ore is solution mined using an aqueous solvent to form a solution known as "brine" which is high in total dissolved solids. A substantial proportion of the dissolved solids is made up of alkali. The alkali content (alkali value) is typically 12 to 17.5 weight percent sodium carbonate and about 3 to 5 weight percent sodium bicarbonate. Actual values of sodium carbonate and sodium bicarbonate can vary due to such factors as temperature and residence time of ore in contact with the mining solution. Recovery of alkali values is typically obtained through heating the brine at temperatures of about 100° C. to about 140° C. to convert sodium bicarbonate to sodium carbonate and drive off any resulting carbon dioxide. The partially stripped brine is concentrated, where additional $CO_2$ may be removed. The resulting brine, which typically contains a reduced sodium bicarbonate content, is then preferably reacted with an aqueous sodium hydroxide solution (generally formed by causticizing sodium carbonate values with calcium oxide or calcium hydroxide) in such amounts as to convert most of the remaining sodium bicarbonate in the brine to sodium carbonate. The sodium hydroxide-treated brine is then preferably cooled to a temperature of about 25° C. to 5° C., precipitating sodium carbonate decahydrate crystals. The sodium carbonate decahydrate crystals are separated from their mother liquor through means such as a centrifuge. The separated decahydrate crystals can then be dissolved to form a sodium carbonate solution. This solution can be heated, such as to a temperature range of from about 60° C. to approximately 110° C., to evaporate water and crystallize sodium carbonate monohydrate crystals. The sodium carbonate monohydrate crystals can then be calcined to produce soda ash.

Nahcolite ore, comprised mostly of sodium bicarbonate, is another mineral which can serve as a source of soda ash.

An unfortunate and highly disadvantageous by-product of both the dry and solution mined processes is the formation of magnesium or other deposits or scale on the surfaces of the processing equipment and otherwise. In addition to the desired high alkali values, the process solution can also contain magnesium and other impurities, which can contribute to such scale. The magnesium values are especially problematic in a solution mined processes where feed liquor is obtained by solution mining, due to the long residence time of the aqueous solubilizing medium in the mine and/or the increased opportunity to acquire such values when more than one stratum is mined. Similarly, magnesium values can also be present after dry-mined ore is dissolved in an aqueous medium. In either dry mined or solution mined processes, the magnesium can precipitate out during processing, forming scale on the surfaces of heat exchangers and other processing equipment.

Some of the scale is a result of the precipitation of eitelite ($Na_2Mg(CO_3)_2$). There are three sets of soda ash processing conditions which chiefly lead to eitelite scale formation.

These conditions are 1) Promoting $CO_2$ removal from the liquor, converting at least a portion of the $NaHCO_3$ to $Na_2CO_3$, regardless of temperature, 2) increasing the liquor temperature, and 3) concentrating the magnesium in the solution mined feed, regardless of temperature or carbonate/bicarbonate concentration. When the equilibrium magnesium solubility is exceeded, scale can potentially form.

U.S. Pat. No. 5,283,054 describes a process whose first step is to preheat the liquor prior to $CO_2$ stripping. In this process, most of the $CO_2$ stripped liquor is sent to an evaporator in order to concentrate the liquor prior to crystallizing the intermediate carbonate decahydrate. Significant quantities of eitelite scale can form in the stripping column and evaporator preventing the mass transfer rates required to evolve $CO_2$ from the solution. In addition, heat exchangers used to preheat the solution mined-based liquors can become scaled.

U.S. Pat. No. 5,262,134 describes a solution mine based process. After heating the mine liquor to remove some of the $CO_2$ and evaporate water, the process stream is subjected to a cooling crystallization to remove sesquicarbonate. Eitelite scale formation can be a problem with this process as well.

U.S. Pat. No. 5,609,838 describes a solution mining related process which uses steam stripping at 90° C. or below to partially decompose sodium bicarbonate as a first step in the process. Prior to feeding the $CO_2$ stripper, the mine liquor is passed through a heat exchanger where scale is likely to form.

Solution mine-derived feeds can also be fortified with either calcined, or uncalcined, dry mined trona ore. After separating the ore insolubles via clarification or filtration, the liquors containing $Na_2CO_3$, $NaHCO_3$, and dissolved magnesium can give rise to scale formation if this equilibrium solubility is exceeded downstream in the process.

Exemplary flow diagrams and process descriptions for some useful processes are provided by Isonex Inc. at its Internet web site, www.isonex.com.

Elevated process temperatures present in the soda ash extraction process and the inverse solubility of magnesium salts like eitelite foster precipitation of magnesium as scale since Mg solubility decreases with increasing temperature. When the equilibrium solubility is exceeded, via heat exchange or otherwise, scale formation is likely to result.

When feed, especially from solution mined ore, is evaporated at elevated temperatures with $CO_2$ stripping, scale formation is more likely to occur. The following tables set forth data comparing evaporation of typical process liquor at 104° C. with and without $CO_2$ stripping.

TABLE I

Evaporation Without $CO_2$ Removal

| | % $Na_2CO_3$ | % $NaHCO_3$ | ppm Mg | % Bicarbonate Decomposed | % Mg Precipitated |
|---|---|---|---|---|---|
| Feed Liquor | 13.0 | 4.6 | 40 | | |
| Concentrated Liquor | 20.8 | 7.0 | 62 | 4 | 2 |

TABLE II

Evaporation With $CO_2$ Removal

| | % $Na_2CO_3$ | % $NaHCO_3$ | ppm Mg | % Bicarbonate Decomposed | % Mg Precipitated |
|---|---|---|---|---|---|
| Feed Liquor | 13.0 | 4.6 | 40 | | |
| Concentrated Liquor | 22.8 | 3.80 | 46 | 47 | 26 |

Since the temperature was constant (at the atmospheric pressure boiling point) for both examples, it is clear that $CO_2$ removal reduces the ability of magnesium to supersaturate and assists in its precipitation.

Equilibrium magnesium solubilities in solutions containing a range of sodium carbonate and bicarbonate concentrations also show that as the carbonate-to-bicarbonate ratio increases, the solubility of magnesium decreases. The following equilibrium magnesium solubilities were measured for reagent grade (pure) solutions which were also saturated in alkali content at a constant temperature of 20° C.

TABLE III

Equilibrium Mg Solubilities

| % $Na_2CO_3$ | % $NaHCO_3$ | ppm Mg |
|---|---|---|
| 6.0 | 6.3 | 64 |
| 9.0 | 5.6 | 60 |
| 12.0 | 4.9 | 54 |
| 14.0 | 4.5 | 50 |
| 17.0 | 4.0 | 44 |

When the equilibrium magnesium solubility is exceeded, conditions are ripe for eitelite precipitation and scale formation, regardless of temperature.

Increased magnesium concentration in the feed, regardless of temperature or carbonate/bicarbonate concentration, can also cause scale formation when the equilibrium magnesium solubility is exceeded. This is a particular problem in solution mined processes.

Scale formation generally increases as the process temperature increases. As a result, evaporator surfaces and process equipment that are elevated in temperature are particularly prone to scale. Scale retards the efficiency of the heat exchanger as the scale levels increase. Scale may also partially, or completely, close passageways or other openings in the processing system, and impede the flow of the process solution through the various stages of the soda ash recovery process. Scale is difficult to remove and can generally be done only through such inconvenient and expensive means as acid washing or acid cleaning. A main drawback to acid washing is that the processing line needs to be shut down in order to remove the scale. Shutting down the production line is an unacceptable or unattractive option to most soda ash producers. Delaying or increasing the intervals between acid washing or acid cleaning would be highly advantageous.

Methods for reduction of magnesium scale in soda ash production have been considered but are believed not to be as useful as the present processes. For example, one proposed solution was to lower the heat exchanger or evaporator skin temperatures to reduce the precipitation of magnesium. This, however, was only a partial solution because magnesium precipitation still occurred.

A number of chemical additive materials were tried in unsuccessful attempts to reduce or eliminate magnesium scale in soda ash recovery processes. Such materials included phosphates such as sodium tripolyphosphate, $Na_5P_3O_{10}$, and tetrasodium pyrophosphate, $Na_4P_2O_7$. These were found not to achieve acceptable reduction in scale formation. Glassy (amorphous) phosphates, having formula

[NaPO$_3$]$_n$· PO$_4$, made by the FMC Corporation and sold under the following trade names were also employed without success: SODAPHOS (glassy (amorphous) phosphates) (n=6), HEXAPHOS (glassy (amorphous) phosphates (n=13), and (glassy (amorphous) phosphates) (n=21). Each of the foregoing phosphates was tested at 100 ppm of the compound in laboratory batch evaporation and CO$_2$ stripping tests. Duplicate sets of tests were run, yielding essentially the same, unacceptable, results.

Commercially available water treatment products were also tried without success. BELSPERSE 161 (phosphinocarboxylic polymer) and Belclene 200® are aqueous water treatment products made by FMC Corporation's Process Additives Division. BELSPERSE 161 contains a phosphinocarboxylic polymer and the product literature indicates "good" Ca and Mg sequestration ability. It also functions as a dispersant to help prevent adherence to heat transfer surfaces. BELCLENE 200 (low molecular weight maleic acid polymer) is a low molecular weight maleic acid polymer which functions primarily by altering the crystal structure of mineral scale deposits.

Several antiscalant products sold by Betz Laboratories were also tried in two sets of tests; the first used 20 ppm of each: GCP 187 (antiscalant products sold by Betz Laboratories) and GCP 9319 (antiscalant products sold by Betz Laboratories). The chemical makeup of these products is not known.

Betz Laboratories water treatment products which contain alkylepoxycarboxylates (AEC), which are advertised in the trade literature as alternatives to phosphonates for inhibiting the formation of calcium carbonate scale, were also evaluated. It is believed that these products contain mixtures of chelating agents and threshold inhibitors. Products GCP 9313 (alkylepoxycarboxylates), GCP 9317 (alkylepoxycarboxylates), GCP 9318 (alkylepoxycarboxylates), and GCP 9322 (alkylepoxycarboxylates) were each tested at 25 ppm of the as-sold product. These were determined to be ineffective in controlling scale in alkaline, highly concentrated, soda ash process liquors.

Two Nalco Company products, NALCO 9721 (aqueous solution of an organic polymer salt) and NALCO 9762 (aqueous solution of an organic polymer salt) were also tried at 25 ppm and found to be ineffective as antiscalants. Additionally, certain DEQUEST brand products of the Monsanto Company were tried at 20 ppm as the as-sold product and were found to be ineffective. These were DEQUEST 2000 (phosphonate compounds), 2006 and 2060.

VERSENOL 120 (compound based upon the trisodium salt of N-hydroxyethylethylenediamine tricetic acid) is sold by Dow Chemical Corporation and is based upon the trisodium salt of N-hydroxyethylethylenediaminetriacetic acid. This chelating agent was also tried at 20 ppm on the as-supplied product basis without acceptable results.

Zeolite-A, an aluminosilicate molecular sieve, which functions by selectively absorbing cations and/or anions within its inorganic matrix, was also used. Selectivity is based upon the nature of its porous matrix, particularly pore size. This is commonly used in European laundry detergents to sequester calcium and magnesium- based "dirt." However, at suspended concentrations between 100 and 5,000 ppm, the zeolite was ineffective in controlling magnesium deposition from alkaline liquors in laboratory CO$_2$ stripping and evaporation tests.

It is therefore greatly desired to provide means of reducing or inhibiting magnesium scale formation on the surfaces of heat exchangers or other processing equipment which can be easily applied to soda ash extraction processes without adding additional processing steps or effecting the yield or chemistry of the resulting soda ash or sodium carbonate.

SUMMARY OF THE INVENTION

The present invention provides methods for reducing or inhibiting the formation of scale, especially magnesium scale, e.g. on the surfaces of processing equipment used for extracting soda ash from trona nahcolite ore. Such scale formation typically occurs during the processing of ore which has been mined either through dry or solution mining. Extraction of soda ash from trona ore is well-known to persons of ordinary skill in the art and such knowledge is presumed throughout. An exemplary process is disclosed in U.S. Pat. No. 5,283,054, which is incorporated herein by reference. However, all such processes can benefit from the present invention.

In accordance with the invention, soda ash is produced from trona ore by providing an aqueous solution of trona ore-derived values for subsequent processing. It will be understood that trona ore is contacted with water or dilute alkaline solvent under conditions which solubilize the ore forming a brine. Solution mined liquor may contain low concentrations of suspended insolubles which are preferably removed. Insoluble materials are typically separated from the solution in any convenient way, such as by settling, centrifugation or filtering. In this regard, the liquor or brine, which is typically obtained via solution mining, can have insoluble materials removed and used in an extraction process. In any event, a brine of mineral values deriving from trona ore results for further processing. The solution also typically contains dissolved magnesium and sometimes other divalent metals. The avoidance of the deposition from the solution of magnesium and other divalent salts as scale is a principal object of this invention.

Soda ash is extracted from the ore solution through one or more concentration steps. The process stream is raised to an elevated temperature, typically followed by cooling. The concentration precipitates the soda ash or soda ash precursor solids. A plurality of concentration steps is preferred in some embodiments and each concentration can be attended by scale formation. It will be understood that the solid precipitants from the concentration steps may be either soda ash itself or precursor solids, such as sodium carbonate decahydrate, sodium sesquicarbonate, sodium carbonate monohydrate or other hydrates or blends, which may be transformed, generally through heating, into soda ash.

The present invention reduces magnesium scale formation by adding to the ore solution a diphosphonic acid. A preferred diphosphonic acid for use herewith is 1-hydroxy-ethylidene-1,1-diphosphonic acid (HEDPA). This material is available commercially as a 60% by weight active solution, based upon the free acid, sold by the Monsanto Chemical Company under the trademark DEQUEST 2010 (1-hydroxy-ethylidene-1,1-diphosphonic acid) or under the Albright and Wilson trademark BRIQUEST ADPA-60AW (1-hydroxy-ethylidene-1,1-diphosphonic acid). Other diphosphonic acids may also be used especially alkyl homologs of the ethylidene species. Thus, the propylidene, butylidene and pentylidene homologs may similarly be employed. Such materials are believed to be known, per se and are believed to be useful in connection with certain embodiments hereof. Salts, especially the sodium and potassium salts of the foregoing are preferred. The present invention also provides methods of reducing the formation of scale in the production of soda ash from nahcolite ore comprising providing an aqueous brine of nahcolite ore-derived values; performing upon the brine at least one of the steps of $CO_2$ removal, water removal and heating; and prior to at least one of said steps, adding 1-hydroxy-ethylidene-1,1-diphosphonic acid, 1-hydroxy-propylidene-1,1-diphosphonic acid, 1-hydroxy-butylidene-1,1-diphosphonic acid, or 1-hydroxy-pentylidene-1,1-diphosphonic acid to the solution.

Figure 1:
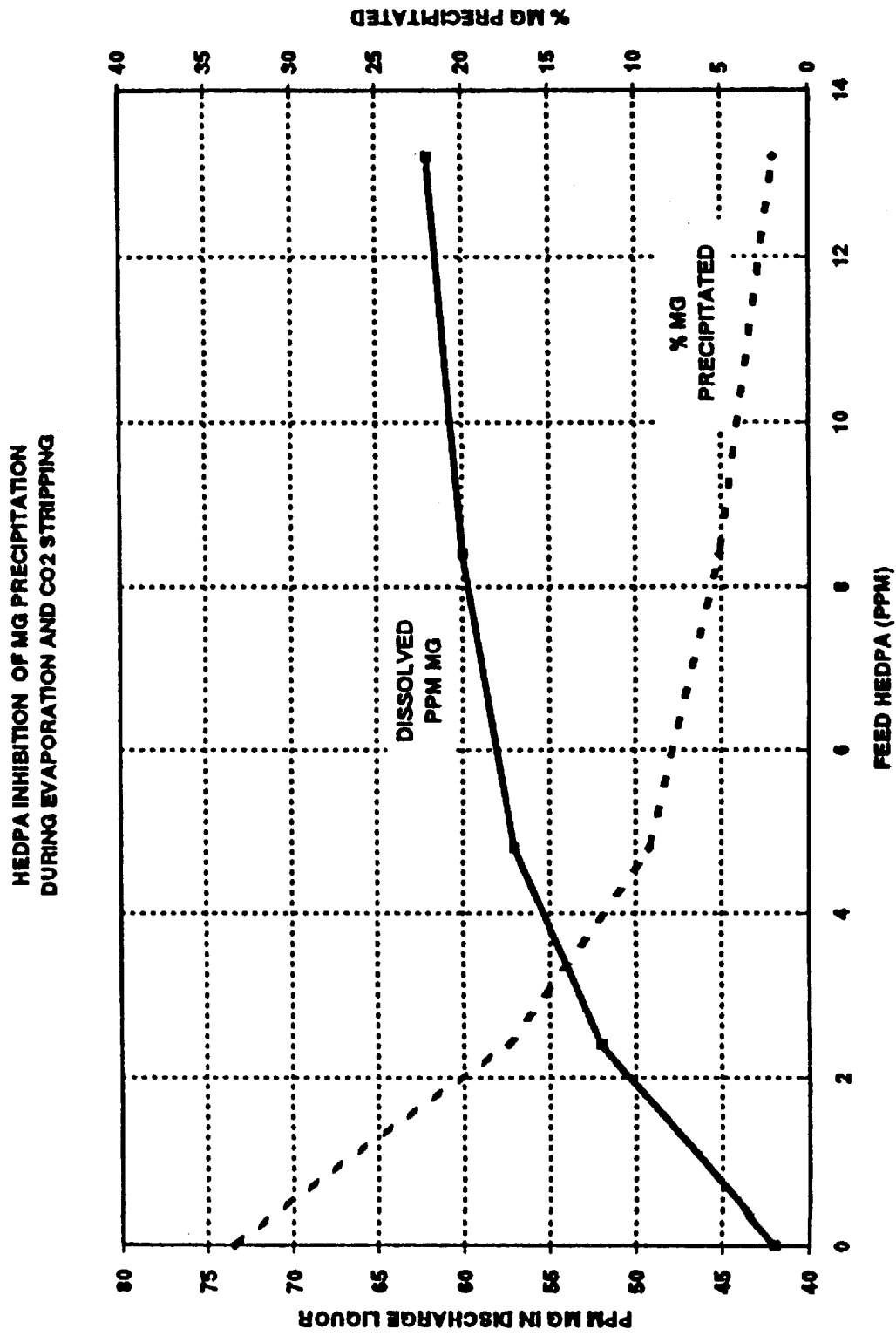
FIG. 1 is a graph that illustrates that in a soda ash recovery process, as the amount of HEDPA (provided as the formulation sold under the trademark DEQUEST 2010 (1-hydroxy-ethylidene-1,1-diphosphonic acid) added to trona-derived solutions increases, the amount of dissolved magnesium increases while the percentage of magnesium precipitated from solution decreases.

The diphosphonic acid is preferably added to the solution prior to the process point where scale deposition is anticipated. This is usually prior to the first elevation in temperature of the solution, which is typically attendant to a first concentration step, but may be added prior to carbon dioxide stripping or prior to any other step in which magnesium concentration is likely to increase. It is preferred to add the diphosphonic acid at any point after the separation of waste solids from the liquid phase. For HEDPA, it is convenient to achieve addition through the mixing of an aqueous HEDPA solution with the process liquor prior to either a first heating step, prior to a first $CO_2$ stripping step (with or without heating) or prior to a first concentrating step. The phosphonic acid solution is conveniently from 50 to 60 percent by weight in HEDPA (or other diphosphonate) based upon free acid.

The diphosphonic acid (or salt thereof) is added in an amount so as to be effective for the purpose of diminishing scale, especially magnesium scale formation. While this amount will vary from process to process and from ore to ore, amounts of diphosphonic acid of from about 1 to about 75 ppm by weight and preferably from about 3 to about 50 ppm by weight of the ore solution have been found to be preferred. It is more preferred to employ amounts of diphosphonic acid of from about 5 to about 35 ppm by weight in the solution and still more preferred to employ from about 10 to about 30 ppm. In this context it will be understood that such concentrations are based upon the point of addition and not by reference to any subsequent concentration of the brine.

It will be appreciated that magnesium scale formation tends to increase with increasing processing temperatures. At the same time, however, such increased temperatures are desirable in order to achieve beneficial processing throughput. Accordingly, the present invention may be used in connection with processing temperatures, e.g. for concentration steps, in excess of 25° C.

In accordance with the methods of the invention, the process solution from which the soda ash values have been recovered is discharged from the process. It is desired to maintain magnesium in the solution such that it will be discharged rather than deposit on process surfaces. In accordance with the present invention, it is now possible to achieve magnesium concentrations in the discharge liquor of at least about 15 ppm by weight. Higher values may also be achieved including amounts of at least about 20, 25 or 30 ppm by weight.

Although it is unclear if HEDPA works as either a sequestering agent, threshold inhibitor or both, HEDPA does inhibit magnesium precipitation. The HEDPA can be added to the process at or before the point in the extraction process where scale formation occurs. In determining the optimum HEDPA dosage, its cost must be balanced with the willingness to undergo system maintenance, process down time, and increased frequency of acid cleanings. Relatively lower doses of HEDPA can be used when desired. In general, effective HEDPA concentrations in the process solutions (before any subsequent concentration) is from about 1 to about 75 ppm by weight. It is preferred to employ from about 3 to about 50 ppm with from about 5 to about 35 being more preferred. Even more preferred are ranges of from about 10 to about 30 ppm by weight of the entire ore solution. A weight ratio of HEDPA to magnesium of from about 0.03 to 2 is usually effective in inhibiting scale formation, but other ratios may also be employed, especially where cost concerns are significant. According to a further embodiment of the invention, a weight ratio of HEDPA to magnesium of at least 0.7 to 1 is preferred with ratios between about 0.8 and 1.2 being more preferred. In accordance with certain preferred embodiments of the invention, a weight ratio of HEDPA to magnesium of about 1 to 1 may be employed when added into the extraction process prior to, or at the point of, scale formation.

The present invention is very well adapted to the processes described in U.S. Pat. No. 5,283,054, incorporated herein by reference. In processes disclosed in that patent, trona ore is dissolved in a dilute brine solution which contains small amounts of sodium carbonate and/or sodium bicarbonate. A possible source for the brine solution can be derived in part from liquor recovered from underground tailings disposal. See U.S. Pat. No. 5,043,149, incorporated herein by reference. This brine solution containing dissolved trona ore is sent through a variety of process steps to extract sodium carbonate or soda ash.

A first step in the process exemplified in U.S. Pat. No. 5,283,054 is to heat feed brine to a temperature ranging from 100° C. to 140° C., preferably from about 105° C. to 125° C., to decompose some of the bicarbonate values to carbonate and drive off the resulting carbon dioxide in a steam stripping column. The sodium content of the brine is also concentrated. As desired, concentration of the brine may be carried out in single or multiple stages. A preferred method of performing both functions of concentration and decomposition is in a mechanical vapor recompression (MVR) unit due to the high efficiency of such equipment. Alternatively, this process can be carried out in multiple steps such that the bicarbonate values can be decomposed, without substantial concentration of the feed liquor, in a stripping column, while an evaporator performs the concentrating function along with additional bicarbonate decomposition.

Processes are also known which employ low temperature carbon dioxide stripping. See, e.g. U.S. Pat. No. 5,609,838, incorporated herein by reference. The present invention is applicable to such methodologies as well.

In a following processing step, the concentrated brine is preferably treated with a dilute aqueous sodium hydroxide solution (preferably obtained through causticizing sodium carbonate and/or sodium bicarbonate with lime in a parallel process) in an amount sufficient to neutralize much of the remaining bicarbonate values in the brine. The resulting, neutralized brine, which is essentially a concentrated sodium carbonate solution having a total alkali value greater than the feed brine, is used as a feed to a sodium carbonate decahydrate crystallizer for recovery of sodium carbonate decahydrate crystals. These are subsequently preferably recrystallized as carbonate monohydrate.

In order for the diphosphonic acids of this invention to work most effectively, and prevent the magnesium from precipitating out as scale, it is preferred that there remain a slight amount of bicarbonate (greater than about 0.1% by weight $NaHCO_3$) present in the process solution after the neutralization step. Too much caustic added during the neutralization step can interfere with the ability of HEDPA to sequester magnesium.

Magnesium scale formation can occur at many points throughout the recovery processes. The elevated temperatures in soda ash production processes can cause magnesium and other impurities, which are present in the process solution, to precipitate out onto the surface of the evaporator and other processing equipment. HEDPA is preferably introduced into the extraction process prior to the stripping and evaporation steps. The addition of DEQUEST 2010 (1-hydroxy-ethylidene-1,1-diphosphonic acid) has been shown to be effective in preventing magnesium from precipitating out and forming scale. DEQUEST 2010 (1-hydroxy-ethylidene-1,1-diphosphonic acid) may function in this context by helping the magnesium to remain dissolved in the process solution. The DEQUEST 2010 (1-hydroxy-ethylidene-1,1-diphosphonic acid) solution present in the process solution passes through the system in the mother liquor discharge from the final steps of the extraction process. Essentially no DEQUEST 2010 (1-hydroxy-ethylidene-1,1-diphosphonic acid) is found in the decahydrate crystals prior to the mono crystallization step. It is to be understood that the present invention is not limited to the specific embodiments disclosed herein, but that the same is applicable generally to reduction of scale in soda ash recovery from trona and nahcolite ores.

FIG. 1 is a graph that illustrates that as the amount of 1-hydroxy-ethylidene-1,1-diphosphonic acid, HEDPA, increases, the amount of magnesium that remains dissolved in solution correspondingly increases while the percentage of magnesium that is precipitated out of solution decreases. The figure refers to information obtained during a laboratory evaluation of the effectiveness of DEQUEST 2010 (1-hydroxy-ethylidene-1,1-diphosphonic acid) in inhibiting magnesium precipitation. Five solutions were prepared that modeled the composition of a typical solution-mined liquor composition post filtration. That composition was heated to 104° C. under conditions promoting decomposition of bicarbonate and $CO_2$ removal, which evaporated 36 gms of water and increased the concentration of total alkalinity from 16 to 25% TA. This was used to simulate the $CO_2$ stripping and evaporation steps of a trona ore soda ash extraction process.

The X axis is entitled "Feed HEDPA (PPM)". This refers to the initial amount, in ppm by weight, of HEDPA that is added via a stock solution to 100 gram aliquots of test solution containing 40 ppm magnesium, prior to subjecting the solution to a temperature of 104° C. and evaporating 36 gms of water. The aqueous stock solution was made to contain 3,000 ppm HEDPA in 100 grams water. To achieve 22 ppm DEQUEST 2010 (1-hydroxy-ethylidene-1,1-diphosphonic acid) (13.2 ppm HEDPA) in the initial solution of 100 gm of simulated mine liquor, 0.44 grams of the prepared stock solution was added prior to the simulated evaporation.

The $Y_1$ axis, (left) entitled "PPM Mg in Discharge Liquor," refers to the amount of magnesium expressed in ppm by weight that remained dissolved in the (concentrated) 64 grams of process solution. The $Y_2$ axis, (right) entitled "% of Mg Precipitated," refers to the amount of magnesium that precipitated out of the solution after the simulated evaporation and precipitation.

As FIG. 1 shows, increasing HEDPA concentrations give rise to increasing magnesium in the solution with concomitant diminution of magnesium precipitation. Table 1 provides additional data to that depicted in FIG. 1. It shows the level of HEDPA that is added to the process solution in ppm (by weight), the TA of the process solution, and the corresponding ppm of magnesium that remains dissolved in the solution. A level of HEDPA of 13 ppm has been found to be highly effective in lowering the percent of magnesium precipitated to only 2%. At that level, the amount of magnesium kept in solution was 62 ppm by weight.

When eitelite or ore insolubles are present in significant quantities in the solution, the HEDPA is not so effective in keeping magnesium dissolved. It is believed that an equilibrium between sequestered/dissolved magnesium and precipitated magnesium is reached. For example, a solution of DEQUEST 2010 (1-hydroxy-ethylidene-1,1-diphosphonic acid) at 25 ppm (15 ppm as HEDPA) kept 68% magnesium dissolved when solid eitelite was present. The concentrated liquor contained 28 ppm magnesium at 28% TA. By comparison, the 22 ppm DEQUEST 2010 (1-hydroxy-ethylidene-1,1-diphosphonic acid) solution (13 ppm HEDPA) kept 62 ppm magnesium solubilized at a TA of 25% in the concentrated liquor when no eitelite was present. The nominal value of 22 ppm DEQUEST 2010 (1-hydroxy-ethylidene-1,1-diphosphonic acid) acts as a threshold concentration which serves to keep the magnesium concentration at a supersaturated level as long as no eitelite solids are present. If scaling starts to occur, the dissolved magnesium concentration starts dropping to reach an equilibrium level. If the brine which feeds the stripper contains less than 40 ppm magnesium, the DEQUEST 2010 (1-hydroxy-ethylidene-1,1-diphosphonic acid) concentration can be decreased to less than 20 ppm while still controlling essentially all of the magnesium. When scaling begins to occur, increasing the DEQUEST 2010 (1-hydroxy-ethylidene-1,1-diphosphonic acid) will slowly redissolve the magnesium from the eitelite scale, causing it to dislodge from the equipment. Lesser concentrations of HEDPA in process solutions have been found to be very useful in avoiding scale formation as well.

In the present application, references to concentrations as "ppm" mean parts per million, by weight in a particular process stream.

The term "TA" refers to a solution's total alkalinity and is the sum of the sodium carbonate and bicarbonate concentrations expressed on a $Na_2CO_3$ basis.

TABLE 1

| | INITIAL SOLUTION | | | | | | | | | | |
|---|---|---|---|---|---|---|---|---|---|---|---|
| AGENT | PPM DEQUEST 2010 (1-hydroxy-ethylidene-1,1-diphosphonic acid) | Grams PPM HEDPA | Final HEDPA Stock | Approx Grams | % $Na_2CO_3$ | % $NaHCO_3$ | % TA | PPM Mg | PPM Ca | Percent PPM Fe | Mg Precp'd (TA Basis) |
| None | 0 | 0 | 0.00 | 64 | 22.2 | 4.3 | 25.0 | 42 | 8 | <2 | 33 |
| Dequest 2010 | 4 | 2.4 | 0.08 | 64 | 22.7 | 3.7 | 25.0 | 52 | 8 | <2 | 17 |
| Dequest 2010 | 8 | 4.8 | 0.16 | 64 | 23.0 | 3.4 | 25.1 | 57 | 9 | <2 | 9 |
| Dequest 2010 | 14 | 8.4 | 0.28 | 64 | 22.5 | 4.1 | 25.1 | 60 | 9 | <2 | 5 |
| Dequest 2010 | 22 | 13.2 | 0.44 | 64 | 22.9 | 3.4 | 25.0 | 62 | 9 | <2 | 2 |
| Initial Solution, Filtered Through 5µ | | | | 100 | 13.0 | 4.6 | 15.9 | 40 | 5.2 | — | — |
| Initial Solution, Unfiltered | | | | 100 | 13.0 | 4.6 | 15.9 | 42 | 5.2 | — | — |

What is claimed is:

1. A method of reducing the formation of scale in the production of soda ash from trona ore comprising:
   providing an aqueous brine of trona ore,
   performing upon the brine at least one of the steps of $CO_2$ removal, water removal and heating; and
   prior to at least one of said steps, adding 1-hydroxy-ethylidene-1,1-diphosphonic acid or a salt thereof to the brine.

2. The method of claim 1 wherein said diphosphonic acid is in an aqueous solution.

3. The method of claim 2 wherein said aqueous solution of diphosphonic acid comprises from about 50 to about 60 weight percent active acid based upon free acid.

4. The method of claim 1 wherein said diphosphonic acid is added in an amount of from about 1 to about 75 ppm of said brine.

5. The method of claim 1 wherein said diphosphonic acid is added in an amount of from about 3 to about 50 ppm of said brine.

6. The method of claim 1 wherein said diphosphonic acid is added in an amount of from about 5 to about 35 ppm of said brine.

7. The method of claim 1 wherein said diphosphonic acid is added in an amount of from about 10 to about 30 ppm of said brine.

8. The method of claim 1 wherein said diphosphonic acid is added in an amount of about 22 ppm of said brine.

9. The method of claim 1 wherein said diphosphonic acid is added prior to stripping of $CO_2$.

10. The method of claim 1 wherein said diphosphonic acid is added prior to a first concentration step.

11. The method of claim 1 wherein said diphosphonic acid is added prior to any heating step.

12. The method of claim 1 wherein said heating is to a temperature greater than 25° C.

13. The method of claim 1 wherein said trona has been solution mined.

14. The method of claim 1 wherein the discharged solution exiting the process has a magnesium concentration of at least about 15 ppm.

15. The method of claim 1 wherein the waste solution deriving from the process has a magnesium concentration of at least about 20 ppm.

16. The method of claim 1 wherein the discharged solution exiting the process has a magnesium concentration of at least about 25 ppm.

17. The method of claim 1 wherein the waste solution deriving from the process has a magnesium concentration of at least about 30 ppm.

18. The method of claim 1 wherein the diphosphonic acid material is a sodium or potassium salt.

19. A method of reducing the formation of scale in the production of soda ash from trona ore comprising:
   providing an aqueous brine of trona ore,
   performing upon the brine at least one of the steps of $CO_2$ removal, water removal and heating; and
   prior to at least one of said steps, adding 1-hydroxy-propylidene-1,1-diphosphonic acid, 1-hydroxy-butylidene-1,1-diphosphonic acid, 1-hydroxy-pentylidene-1,1-diphosphonic acid or a salt thereof to the brine.

20. A method of reducing the formation of scale in the production of soda ash from nahcolite ore comprising:
   providing an aqueous brine of nahcolite ore,
   performing upon the brine at least one of the steps of $CO_2$ removal, water removal and heating; and
   prior to at least one of said steps, adding 1-hydroxy-ethylidene-1,1-diphosphonic acid, 1-hydroxy-propylidene-1,1-diphosphonic acid, 1-hydroxy-butylidene-1,1-diphosphonic acid, 1-hydroxy-pentylidene-1,1-diphosphonic acid or a salt thereof to the brine.

* * * * *